United States Patent Office 3,803,290
Patented Apr. 9, 1974

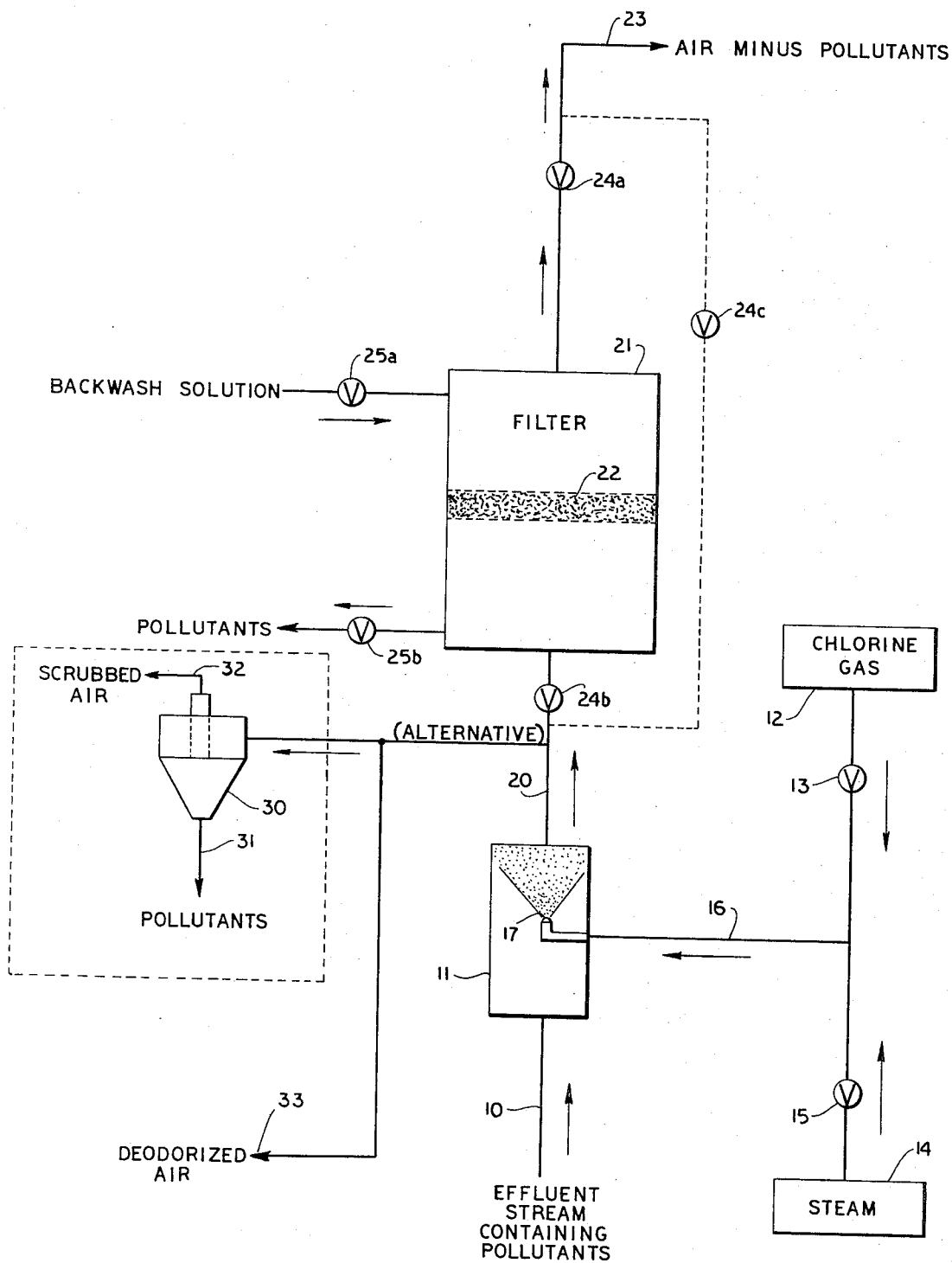

3,803,290
WASTE EXTRACTION PROCESS
Jan W. Gooch, Russellville, Ark., assignor to
Chlortrol, Inc., Russellville, Ark.
Continuation-in-part of application Ser. No. 68,399, Aug. 31, 1970, which is a continuation-in-part of application Ser. No. 781,840, Dec. 6, 1968, now Patent No. 3,586,627, which is a continuation-in-part of application Ser. No. 757,224, Aug. 30, 1968, which in turn is a continuation-in-part of application Ser. No. 696,537, Jan. 9, 1968. This application Jan. 5, 1973, Ser. No. 321,356
Int. Cl. B03c 3/00
U.S. Cl. 423—210
10 Claims

ABSTRACT OF THE DISCLOSURE

A waste oxidation and waste extraction process for deodorizing, coalescing, agglomerating, coagulating, and extracting organic and inorganic waste materials such as found in the particulate and molecular waste effluent streams of packing and rendering plants, paper and pulp mills, food processing plants, wood preserving plants, rice processing plants, and similar facilities. In one embodiment of the invention, the process comprises introducing into the waste stream an activated gas which is adsorbed on the surfaces of the suspended organic and inorganic particulate and molecular waste materials to react with the surfaces of the waste materials and produce surface characteristics which eliminate malodorous properties and induce agglomeration and coagulation of the solids and materials.

CROSS-REFERENCE TO RELATED APPLICATIONS

This application is a continuation-in-part of my previously filed copending application Ser. No. 68,399, filed Aug. 31, 1970 and entitled "Waste Extraction Process"; which was a continuation-in-part of my previously filed copending application Ser. No. 781,840, filed Dec. 6, 1968 and entitled "Process for Agglomerating and Coagulating Waste Material," now U.S. Pat. No. 3,586,627; which was in turn a continuation-in-part of my previously filed copending application Ser. No. 757,224, filed Aug. 30, 1968 and entitled "Improved Extraction Process," which was in turn a continuation-in-part of my previously filed copending application Ser. No. 696,537, filed Jan. 9, 1968 and entitled "Extraction Process."

This invention relates to the oxidation, coalescing, agglomeration, coagulation, and extraction of suspended particulate and gaseous organic and inorganic waste materials suspended and/or combined in various plant and mill gaseous emissions. More particularly the invention concerns the introduction of an activated gas within a waste material gaseous emission so that the activated gas may selectively react with the surfaces of suspended and/or combined waste materials to induce deodorization, oxidation, coalescing, agglomeration, and coagulation thereof.

Many industrial processes normally involve the discharge into the atmosphere of air or other effluent streams which are highly contaminated with pollutants. These pollutants may consist either of particulate or molecular material, as well as combinations thereof, and typically include organic and/or inorganic waste products produced by a process. The disadvantages of such airborne waste discharges are well-known to those in the art. For example, such waste discharges may contain, or react with other atmospheric ingredients to contain substances which are corrosive or otherwise injurious of structural materials, plant life, and even animal life in the surrounding area subject to the atmospheric discharge. Moreover, certain types of atmospheric waste discharges contain noxious and highly disagreeable odors.

A rendering plant is an example of an industrial operation producing a discharge of contaminated air. In the rendering process, animal parts and various organic waste products are cooked to render protein and fat materials for feed supplements and other uses. During the rendering process, organic matter from the raw materials is heated and cooked in water, producing a byproduct including water vapor and a mixture of organic matter, gases, and other materials borne in the escaping water vapor effluent. The organic matter, such as protein and fat, usually consist of lighter compounds and tends to be in a liquid particulate state. Gases such as ammonia, hydrogen sulfide, and various organic gases resulting from decomposition during the cooking operation, are also frequently found in the vapor discharge. The atmospheric contamination produced by such rendering operations is in part liquid organic compounds which are in colloidal or aerosol solution within the liquid together with gases. The organic matter in aerosol solution is not susceptible to removal by filtration. Furthermore, this organic matter is not highly soluble and therefore can be only partially removed from the aerosol by conventional water scrubbing techniques.

The above-described airborne discharge of a rendering plant diffuses through the atmosphere and contains odors which are notoriously nauseating and obnoxious. Moreover, this vapor discharge contains obnoxious and corrosive compounds such as hydrogen sulfide and acidic gases. The organic matter in the discharge oxidizes slowly in the atmosphere and thus may produce noticeably unpleasant odors at long distances from the rendering plant.

Another example of contamination discharge into the atmosphere is found in the paint industry, where aerosols of organics, pigments, volatile solvents are discharged into the atmosphere. Organic liquids such as paint fumes, varnish fumes, and other organic materials, are injurious to health and produce noticeable and undesirable odors. Furthermore, volatile solvents released into the atmosphere can react in a synergistic manner with nitrogen, oxygen, and other atmospheric gases to form compounds having corrosive and other properties which are worse than those of the individual constituents of the pollution stream.

Other well-known examples of industrial operations which produce an airborne discharge stream containing particulate and/or molecular contaminant products are paper mills, which discharge sulfurous compounds into the atmosphere, and incinerators and other burners utilizing fuels containing sulfur or other materials which are released to the atmosphere upon combustion and which are capable of producing objectionable and damaging substances in the atmosphere.

Principal organic air pollutants include compositions such as saturated and unsaturated aliphatic hydrocarbons such as methane, hexane, ethylene, and acetylene; aromatic hydrocarbons such as benzene and toluene; polynuclear hydrocarbons such as benzopyrene; aldehydes such as formaldehyde and acrolein; phenols; and organic acids. Principal inorganic air pollutants include sulfurous compounds such as sulfur dioxide, sulfur trioxide, sulfuric acid aerosol, hydrogen sulfide; nitrogenous compounds, such as ammonia, and nitrogen oxides; and ozone. Other frequently occurring air contaminants are amines, amino acids, proteins of low molecular weight, fats, fatty acids, and fibers.

As stated, the conventional prior art techniques such as filtration, scrubbing, and cyclone separation are, at best, only partially effective in the removal of malodorous contaminants and other such contaminants in aerosol or gaseous form.

Accordingly, it is an object of the present invention to provide an economical and efficient process for oxidizing, coalescing, agglomerating, coagulating, removing malodorous properties, and extracting particulate, aerosolized, colloidal and molecular waste materials from a gaseous waste emission.

Other objects, features, and attendant advantages of the present invention will become apparent from a review of the following description of an embodiment of the invention, and the accompanying drawing, therein the figure schematically represents one process of the invention.

In accordance with the present invention, particulate, aerosoldized, colloidal, and molecular inorganic and organic waste materials are oxidized, coalesced, agglomerated, and coagulated in a gaseous waste stream through the introduction into the waste stream of an active principal such as an activated gas in molecular form which is selectively adsorbed on the particulate or molecular surfaces of the suspended, dispersed, or emulsified waste material to selectively react with such surfaces and to produce surface characteristics which induce oxidation, coalescence, agglomeration, and coagulation of the waste material. Conventional filtering or other removal techniques are then used to extract the coalesced, agglomerated, and coagulated waste material from the effluent stream and thereby to remove the malodorous properties of the material.

Stated more particularly, the process of the present invention requires the introduction into the contaminated waste stream of an activated gas which, when exposed to contaminant matter in the waste stream, is operative to alter the characteristics of the contaminant matter to enable the contaminants to coalesce, coagulate, and agglomerate to an extent to allow efficient extraction from the flow stream. The active principal is preferably mixed with an appropriate carrier medium such as steam, air, or water at an elevated temperature which enables the principal ingredient to become activated or molecularized upon introduction into the effluent stream to produce a solution capable of reacting with the contaminants in a waste stream. In a preferred embodiment of the present invention, satisfactory results have been obtained using as a carrier medium water at a temperature of about 160° F. to 900° F., or air in the same temperature range, or water at a temperature of about 150° F. to 212° F. A particularly good carrier medium is provided by steam within the range of about 212° F. to 900° F.

The principal ingredient for the foregoing reaction with contaminants consists of those gases which, upon becoming activated, enter into a reaction occurring primarily, if not exclusively, on the surface of contaminating particulate matter, such as matter suspended in the waste stream, and colloidal particles of matter, to produce an alteration of electrical characteristics in the particulate matter which correspondingly changes the phase previously existing between the particulate matter and the waste stream in which the matter is carried. In the case of organic material emitted from animal processing sources, for example, there are substantial quantities of protein which emulsifies the total organic matter in the waste stream and renders such matter incapable of completely settling out. The long chains of the protein molecules become wrapped around the organic particulate matter to isolate such matter from the remainder of the particulate matter in the stream. The characteristics of the long chain protein molecues prohibit such molecules from association with other particulate matter, and so the protein-surrounded matter remains suspended indefinitely in effluent streams consisting of or partially comprising aqueous solutions or substances. It is for this reason that nitrogenous matter is difficult to wash out of aerosols and solutions by absorption or scrubbing operations. Also, malodorous effects and properties can be present even after great reduction of contaminants in air emission and trade-waste air discharges. Such malodorous waste can be diluted by thousands of parts of pure air and still be detected by the olfactory system.

Reaction of the active principal of the present invention by the described process alters the characteristics of the nitrogenous matter by breaking bonds in the chain and allowing the particulate matter to coalesce and coagulate, so that this matter eventually flocculates and thus becomes removable from the waste stream by appropriate conventional techniques. In the case of a liquid, for example, the treated contaminating matter will flocculate and settle out of solution gravitationally, while techniques such as filtration or scrubbing are used to remove particulate matter which is coalesced and coagulated in an aerosol-type discharge stream. However, malodorous effects can be removed without an additional step such as water washing or filtering.

The chemical reactions between the active principal and the organic matter in a discharge stream involve a temporary attachment of the active principal to the particulate matter through oxidation, thereby causing the active principal to become absorbed along at least some locations of the chains of the organic aliphatic compounds. This absorption of the active principal results in breakage of the bonds upon the molecular chain, resulting in a diminution of the emulsifying abilities to an extent which allows the particles to agglomerate and coalesce. Since the reaction on the particles occurs substantially at the particle surface, and not within the interior of the particle, a minimum quantity of active principal is required to accomplish the objects of the present invention. Moreover, control of the quantity of active principal can control the degree of oxidation. Before the functional group of an organic compound is attacked by the active principal, the weakest bond in the carbon chain is attacked and split as described above, thereby sectioning the surface molecules of particulate matter sufficiently to alter the hydrophilic characteristics of the particle and to induce agglomeration with other particles. Such matter is primarily responsible for irritation and stimulation of the organs constituting the olfactory system.

The reactions of the active principal with inorganic constituents of the discharge stream also occur at the interface between the containing media of the discharge stream and the particulate matter. For example, gases such as hydrogen sulfide are oxidized to produce molecular sulphur. Ingredients such as ammonia are oxidized to compounds of the active principal.

The amount of reaction is controlled by the concentration of the active principal and conditions of temperature and turbulence in the discharge stream into which the active principal is introduced.

The chemical reaction between the active principal and a mixture of organic and inorganic contaminants in a discharge stream consists of a competitive reaction by all contaminant constituents for the active principal. The inorganic constituents are present in particle and molecular phase, primarily, and the organic constituents are present in particle phase, primarily. Because of rapid oxidation of the particulate matter by the active principal, which is limited in supply, introduction of the active principal into the discharge stream produces primarily a surface reaction as previously described, providing little opportunity for the reaction to penetrate beneath the immediate surface of the molecules making up the particulate matter.

The nature of the active principal before introduction into the discharge flow stream can be a solution or other miscible mixture, but upon introduction of the active principal and the carrier medium into a flow stream containing contaminants, the active principal must be or become molecular and immisicible in the carrier medium. A miscible active principal upon introduction would remove from the system active principal which accomplishes oxidation of contaminants. Therefore, any suitable carrier medium for dispersing the active principal in the mixture in the flow stream of contaminants is desirable. A suitable active principal must be capable of being shocked or otherwise quickly and instantaneously dispersed and separated from the medium in order to become individual molecular particles capable of completely reacting with contaminants and, therefore, must be incapable of being absorbed from the air stream before reaction with the contaminant matter is complete.

In order to explain how molecular chlorine is accomplished in steam, it is necessary to define the solubility factors of chlorine in water. It is generally necessary to state the temperature, the equilibrium partial pressure of the solute gas in the gas phase, the concentration of the solute gas in the liquid phase, and the total existing pressure on the system.

Chlorine is soluble in water. As the concentration of chlorine increases, the partial pressure of chlorine gas increases until the partial pressure is greater than the existing pressure, assuming atmospheric pressure of 760.0 millimeters of mercury. The concentration of chlorine in water at 20° C. or 68° F. can reach about 7.3 grams per liter of water, which exerts a partial pressure of 760 millimeters of mercury. In excess of this chlorine concentration, the existing pressure is exceeded and therefore free molecular chlorine escapes and separates from equilibrium.

If the temperature of chlorine in water at equilibrium is increased, then the solubility will decrease since the partial pressure of chlorine is increased. If the solution is heated to 100° C. or 212° F., the vapor pressure of the water is 760.0 millimeters of mercury. The partial pressure of the chlorine is in addition to the vapor pressure of water, and solubility has been reduced to zero which causes the gas to separate from equilibrium as molecular gas.

If the chlorine and water are heated above 100° C. in a closed container where pressure may exceed 760.0 millimeters of mercury, then the existing pressure will be the sum of water vapor pressure and chlorine partial pressure in equilibrium. When the existing pressure, greater than atmospheric, is reduced to atmospheric pressure, then the chlorine separates from the water vapor and exists as molecular chlorine as long as the temperature is such that equilibrium cannot be accomplished.

In application to the present process, the molecular chlorine is produced by mixing chlorine with steam under pressure and then releasing the mixture to atmospheric pressure in an air stream. The chlorine exists as hot or superheated gas mixed with steam, which produces a very powerful oxidizing agent capable of reacting with organic matter and other matter almost instantly. If the chlorine is not reacted immediately after injection, then it will cool, the steam will cool, and the chlorine will dissolve easily in water droplets or humid air streams.

Suitable active principals includes those compounds or compositions which become activated as a gas in molecular form to become attracted to a particulate surface in the discharge media within which an activating reaction takes place. Preferred reagents include ammonia, hydrogen sulfide, halogen compounds, carbon dioxide, sulfur dioxide, oxides of nitrogen, and ozone. A particularly preferred group of reagents include ammonia, chlorine, and bromine with especially superior results being achieved through the use of gaseous molecular chlorine. In the case of contaminants made up of certain inorganic gases, whole electron arrangements are found which possess an unshared pair of electrons, examples being sulphur dioxide, hydrogen sulfide, and ammonia. In such circumstances, it is preferable to provide an active principal which either consists of, or contains by addition, the gaseous halogen compound boron tetrafluoride. This gas is capable of forming a coordination bond between itself and the inorganic gases possessing an unshared pair of electrons, producing solid-phase compounds which are removable by techniques and apparatus, and variations thereof, such as Brownian separators, electrostatic separators, centrifugal separators, inertial separators, gravity separators, spray towers, wet cyclones, venturi collectors, perforated impingement trays, packed towers, nucleation scrubbers, turbulent contactors, wet filters chromatographic recovery, and filtration. The boron tetrafluoride can be added to one or more other acting gases, such as chlorine, to make up the active principal which is then introduced into the discharge stream.

Filtration to remove the solid particles resulting from the present process is preferably provided by a filter of solid particles or a filter bed. A particularly preferred filter bed is made of carbon particles having a diameter of about 0.3 to 20.0 millimeters. The carbon particle filters can be washed by backflowing techniques to rejuvenate the filter bed. Alternatively, the treated contaminants can be removed from an aerosol discharge by water scrubbing and/or cyclone separation techniques.

In steam laden or saturated aerosols containing contaminated matter, the contaminants which have been treated by the present process can be removed through condensation of the steam by lowering the temperature of the discharge flow stream. It has been observed that contaminating organic matter tends to flocculate out of the condensate under such treatment.

Referring now to the figure, there is depicted a schematic diagram representing one waste extraction process and system within the scope of the present invention. A discharge stream containing pollutant as described above is admitted through the line 10 into the reactor 11. At the same time, a qauntity of chlorine gas from the gas source 12 is admitted through the valve 13 for mixture with a quantity of steam from the source 14 and admitted through the valve 15. The active principal (chlorine gas, in the embodiment depicted in the figure) is merely mixed with the carrier medium (steam), and is not dissolved in the carrier medium. The mixture of chlorine gas and steam passes through the line 16 and is introduced into the reactor 11 through the nozzle 17 disposed therein causing introduction of molecular chlorine into the reactor. The nozzle 17, in preferred embodiment, is essentially an atomizing nozzle which sparges and sprays the individual particles of the active gas-steam mixture into the flow stream within the reactor. In the case of a very hot discharge flow stream entering the reactor 11, a relatively cold medium can be substituted for steam from the source 14, with the resultant injection of the relatively cool mixture into the reactor accomplishing a rapid dispersion of the active principal caused by the immediate superheating of the relatively cooler medium and active principal.

After the reaction which follows introduction of the active principal into the reactor 11, it is often necessary to mix or agitate the mixture of contaminants plus active principal with a moderate degree of turbulence. This mixing or agitating may be accomplished through the use of a reactor 11 containing spiralling, baffling, or other internal structural features which produce mixing, agitation, and turbulence of the flow stream therein.

The reactions which take place within the reactor 11 between the discharge stream and the active principal are of the type described above, so that the flow leaving the reactor 11 along the line 20 includes contaminants or pollutants which have become coalesced, coagulated, and/or agglomerated for subsequent separation. The flow through the line 20 may, in one alternative, be applied to a filter 21 having a carbon particle filter bed 22 of the type described above, which removes the treated contaminants entering the filter. The vapor of the stream, minus the contaminants which remain in the particle bed 22, exits the filter 21 and may be vented to the atmosphere by the line 23.

As is known to those skilled in the art, the filtering capabilities of the carbon particle bed 22 periodically become exhausted and it is necessary to backwash the filter 21 with an appropriate solution to remove the contaminants extracted by the particle bed, and thus to rejuvenate the filter. This is accomplished by first closing the valves 24a and 24b while opening the valve 24c, to provide a discharge stream bypass around the filter 21 (assuming, of course, that the industrial process producing the polluted discharge stream remains operative during the filter backwashing operation). The backwash valves 25a and 25b are then opened to admit a suitable backwash solution, and the liquid and organic polluting matter previously retained by the particle bed 22 is removed from the filter. The valves are returned to their original positions upon the termination of the backwashing operation, and the filter 21 again functions in the foregoing manner.

Since the filter 21 is necessarily subjected to intermittent shut-down to permit backwashing, it can be seen that continuing operation of the industrial process during periods of shut-down will release pollution-containing effluent to the atmosphere unless a second filter (not shown) is provided to receive the treated stream emerging from the reactor 11 along the line 20. The alternatives are, accordingly, either (1) periodically shutting down the industrial process producing the contaminated effluent stream, (2) discharging contaminants to the atmosphere, or (3) incurring the additional expense of duplicate filters 21. While one or more of these alternatives may be acceptable in many circumstances, the problem of intermittent filter shut-down is avoided through the alternative use of a continuously-operating filtration system such as a cyclone separator 30 connected to receive the flow of treated pollutants discharged from the reactor 11. The cyclone separator 30 functions in the conventional manner to produce a discharge 31 of pollutants and a discharge 32 of scrubbed air suitable for venting to the atmosphere. Where it is desired to accomplish only deodorization, the oxidized flow can be discharged as as 33 into the atmosphere.

The present invention is further illustrated by the following examples.

EXAMPLE 1

A rendering plant which processes animal parts to produce a feed supplement includes cookers and drying kilns which develop a byproduct vapors and gases. The byproduct gases and vapors form an aerosol which has a very rancid odor and which has corrosive characteristics which are deleterious to equipment. The gases and vapors from the rendering plant form an aerosol which is unfilterable and only partially removable by scrubbing. Chemical analysis indicates that the untreated aerosol from the meat cooker contains 58.8 parts per million organic matter and 4.0 parts per million of ammonia gas. This contaminated aerosol is flowed through a reactor at the rate of 100.0 cubic feet per minute. Chlorine gas flowing at the rate of 10.0 cubic feet per minute is mixed with steam flowing at the rate of 110.5 cubic centimeters per minute, and this mixture is injected into the reactor through a nozzle which disperses the chlorine-steam mixture throughout the contaminated aerosol stream to introduce molecular chlorine to the aerosol. The treated aerosol is then flowed through a particle bed of carbon 1.5 inches thick. Analysis of the solution after flowing through the particle bed shows that the organic matter is reduced to 5.2 parts per million and the ammonia gas is reduced to 0.4 part per million. Residual chlorine was 0.0 part per million. The odor of the treated aerosol is reduced to a level which is only slightly perceptible to the olfactory system of humans. The odor units or odor threshold of the untreated air is 25,000 odor units and the treated air rates 10 door units. Odor units are expressed as a unitless number which indicates the number dilutions of the odorous air with fresh air. The odoriferous units test is described in Standard Methods, American Health Association, also known as the ASTM method adopted by the Environmental Protection Agency, of the U.S.A. The foregoing results are produced with chlorine flow rates varying between 9.0–12.0 cubic centimeters per minute, and with steam flow rates varying between 90.0–150.0 cubic centimeters per minute. The temperature of the chlorine-steam mixture is varied between 220° F.–270° F. with no appreciable change in results. There was no residual chlorine or free chlorine in the air discharge after treatment. Residual chlorine test was conducted as in Standard Methods, American Health Association.

EXAMPLE 2

A contaminated discharge from the rendering plant described in Example 1 was obtained by passing air over stored raw materials such as animal carcasses and parts, plus air ventilated from around and over equipment for processing the raw materials. This air, having an odor which is substantial and rancid, consists of organic matter and gases; analysis of the untreated air indicates 27.3 parts per million of organic matter and 12.2 parts per million of nitrogenous matter and rated at 3500 odor units. The air is processed as in Example 1, by passing through a reactor at a flow rate of 150.0 cubic feet per minute and being injected with a chlorine-steam mixture. Chlorine at a flow rate of 5.0 cubic centimeters per minute is mixed with steam at a flow rate of 110.0 cubic centimeters per minute and at a temperature of 220° F. The treated air is passed through a carbon filter of 1.5 inches thickness. Samples are taken by scrubbing untreated and treated air in distilled water. The treated air is found to contain 1.2 parts per million of organic matter and 0.9 part per million of nitrogenous matter. There is no residual chlorine in the treated sample.

EXAMPLE 3

The contaminated discharge described in Example 2 is flowed through the same carbon filter at a rate of 150.0 cubic feet per minute without first being subjected to the chlorine-steam injection treatment. Samples are taken by scrubbing with distilled water. The untreated vapor, as before, contains 27.3 parts per million of organic matter and the treated vapor contains 25.9 parts per million of organic matter. The nitrogenous matter in the untreated air is reduced to 11.7 parts per million, compared with 12.2 parts per million in the untreated sample. The untraeted air is rated at 3500 odor units and treated air contains 3400 odor units.

EXAMPLE 4

A prepared air flow of 13.0 parts per million sulfur dioxide is produced by burning sulfur with a controlled rate of flow of air. This contaminated air flows through a reactor into which is injected a boron tetrafluoride-steam mixture. The air flows at the rate of 100.0 cubic feet per minute. The boron tetrafluoride flows at the rate of 11.8 cubic centimeters per minute into steam which flows at the rate of 102.2 cubic centimeters per minute and at a temperature of 230.0° F. The treated air is flowed through a carbon bed of 1.5 inches thick. The treated air contains 0.8 part per million sulfur dioxide, and 3.9 parts per million suspended matter. The steam temperature is varied between 212° F. and 300° F. Best results are obtained at 230° F. The untreated air is rated at 85,000 odor units, and the treated air is rated at 150 odor units. The same untreated air is flowed through the same carbon bed without chemical treatment and no decrease in sulfur content occurred.

EXAMPLE 5

A cooker at a rendering plant boils animal parts to produce a feed supplement of protein and fat. A cooker releases into the air a stream of contaminants containing a very obnoxious odor and pollution. This contaminated flow is treated by injecting a mixture of hot chlorine and steam, with the chlorine flowing into the steam of 8.0 cubic centimeters per minute and at a temperature of 230° F. The treated sample, after condensing to liquid, appears to contain a flocculation of organic matter which after about one hour completely settled out of the water. The untreated sample, after condensing to water, does not contain flocculation. The treated sample presents a very slight odor of 5 odor units while the untreated sample presents a very substantial and obnoxious odor of 15,000 odor units. The treated sample, which contains flocculation, as well as the untreated sample, is allowed to completely settle. The supernatant from the treated sample contains 1.5 parts per million of organic matter, while the untreated sample contains 101.9 parts per million of organic matter. The treated sample contains no chlorine odor and no residual chlorine.

EXAMPLE 6

The contaminated discharge of Example 5 is treated again, but by varying the temperature of the chlorine and steam mixture. At 212° F. there remains in the treated sample 21.8 parts per million organic matter rated at 5 odor units and at 300° F. there remains in the treated sample 1.5 parts per million of organic matter rated at 4 odor units. At 900° F. for the mixture of chlorine and steam mixture injected into the contaminated discharge, there remains 1.1 parts per million organic matter rated at 3 odor units. The same source of contamination is also treated as in Example 5, but by varying the chlorine gas flow. At 4.0 cubic centimeters per minute of chlorine, the treated sample contains 13.8 parts per million of organic matter, and 50 odor units. At 11.0 cubic centimeters per minute chlorine, the treated sample contained 1.8 parts per million of organic matter and 2 odor units, and at 15.3 cubic centimeters per minute the treated sample contains 1.9 parts per million of organic matter, 175 odor units, and a chlorine residual.

EXAMPLE 7

The contaminated air from the interior of the rendering plant of Example 2 is treated by substituting air as the heated media for chlorine gas. At 150.0 cubic feet per minute of contaminated air through the reactor and a flow of 9.0 cubic centimeters per minute chlorine gas into heated air, the heated air flows at the variable rate of 50.0 and 2000.0 cubic centimeters per minute with best results obtained at 430.0 cubic centimeters per minute, and at a temperature of from 60° F. to 360° F., with best results at 220° F. The temperature of the chlorine-air mixture is varied up to 900° F. At 270° F. best results in the treated sample are obtained. The treated sample contains 2.9 parts per million organic matter. The flow of heated air is varied to 300.0 cubic centimeters per minute with an organic matter residual of 11.7 parts per million and the treated air rated 540 odor units. The chlorine flow is varied from 5.0–15.0 cubic centimeters per minute, with best results obtained at 9.0 cubic centimeters per minute.

EXAMPLE 8

A paper mill produces an air discharge from the digester which is very odorous, containing organic and sulfurous matter along with water vapor. This contaminated air flow is treated by injecting a mixture of chlorine and steam, with the chlorine flowing at a rate of 9.0 cubic centimeters per minute into steam at 230° F. and at a flow rate of 100 cubic centimeters per minute. The treated air is then passed through a carbon filter 1.5 inches thick. Samples of untreated and treated air are taken by scrubbing with distilled water. Chemical analysis of the samples indicates that the untreated sample contains 23.8 parts per million of organic matter, while the treated sample contains 12.0 parts per million of organic matter. The untreated sample is very odorous and has 79,000 odor units, while the treated sample has only a slightly perceptible odor rated at 15 odor units.

EXAMPLE 9

A flow of condensed steam from the cooker in Example 1 is treated with chlorine dissolved in water and then sprayed into the condensed 160° F. water solution containing organic matter and dissolved gases. The solution immediately after mixture, is mixed with moderate turbulence for a few seconds and then allowed to settle. The organic matter flocculates and settles out of the solution in one hour, leaving a clear supernatant similar to the supernatant from Example No. 5. At lower temperatures the flocculation does not occur. The flow of hot liquid water containing the organic matter is 1000.0 milliliters per minute when the chlorine concentration in the waste water reaches 0.1–0.03 grams per liter of water. The odor is greatly reduced and organic matter has settled out. The chemical oxygen demand, after treatment of the contaminated condensed steam, is reduced by 95.0 percent of the original chemical oxygen demand. When the temperature of the chlorine-water mixture is reduced to room temperature the treatment is ineffective, and it is found that the temperature of the chlorine-water mixture had to be close to the temperature of the condensed vapor from the cookers to be effective. Cooling after treatment by the prescribed method is ineffectual, and organic material flocculated and settled quickly, 90.0 percent flocculating and settling in 15.0 minutes, and the remaining 5.0 percent in a total of 55.0 minutes maximum. Cooled condensed steam only drops the dissolved organic matter when treated while hot and above 120° F., with best results between 160° and 212° F. When the temperature of condenesd steam drops too low, below 160° F., only sporadic coagulation occurs and this is not sufficient to separate the bulk of organics and produce clear supernatant. Chlorine is contained in the sludge material as chloro-compounds. There is never any residual chlorine gas in the supernatant unless the treatment is over-dosed, in which case a reduction of chlorine feed is necessary. The treatment as described requires dosage of about 60.0 parts per million chlorine per liter of condensed steam. There is a pH drop of 0.1 unit after treatment, but there is no residual chlorine after treatment. It is preferable to keep the pH of the condensed steam before treatment at 5.6–5.9 for best flocculation results. Harsh turbulence is applied to the treated flow, but flocculation does not occur well. Very slight turbulence is also applied, but good flocculation does not occur. Turbulence applied by twisting the flow through a tube into which a spiraling plane was welded gives best results, with little turbulence but with very good mixing. Turbulence above 2000 Reynolds number is best for initial contact between chlorine solution and hot condensate. Reynolds number below 50,000 during contact or mixing of chlorine solution and water is preferable. Above 50,000 Reynolds number is too turbulent and below 2000 is too laminar or not turbulent enough.

EXAMPLE 10

The air flow from Example 2 is treated as in that example, but the treated air is not filtered. The treated air is flowed into an air cyclone for separating suspended matter from a fluid. The principal of the cyclone consists of centrifugal force produced on suspended matter when air is flowed under pressure tangentially to direction of rotation whereupon the air swirls around and down to the conical shape of the cyclone increasing the velocity due to decreasing diameter. The suspended matter is thrown to the outside of the rotation and against the walls of the cyclone while the cleaned air forms a vortex in the center of rotation and escapes through the top of the cyclone while the solid matter escapes through the bottom of the cyclone.

The air before entering the cyclone is subjected to a spray of water in the form of a mist and then allowed to enter the cyclone together with the air and suspended matter. The water droplets then separate from the aerosol and pass out of the bottom of the cyclone since the droplets are heavier than air and in which suspended. The air is allowed to escape through the top of the cyclone and is found to be water droplet free. The initial untreated air flow contains 27.3 parts per million of total of organic matter and is very odorous at 3500 odor units The air after being sprayed with water, then flowing into the cyclone and after leaving the cyclone, contains 0.9 part per million total of organic matter and 0–1 odor unit. The water leaving the bottom of the cyclone is turbid and consists of 179.4 parts per million organic matter and 16 odor units, being the collector of most of the organic matter in the aerosol and thus concentrating such organic matter in water. There is no residual chlorine.

The method described experimentally above was run continuously for four hours with consistent results. The advantage of continuous operation of separation is preferred compared to filtration since backwash is not necessary and interruption of operation is never necessary. The cyclone operation without hot chlorine treatment, but with only water spray, yielded 20.1 parts per million organic matter and 2500 odor units.

EXAMPLE 11

A discharge stream of rendering air from inside the cooking area of a rendering plant is flowed into a reactor at the rate of 100.0 cubic feet per minute. A flow of chlorine at 4.0 cubic centimeters per minute is mixed with steam flowing at the rate of 100.0 cubic centimeters per minute. The chlorine-steam mixture is released within the reactor into the discharge stream under 7–10 pounds per square inch of pressure, which thoroughly saturates the discharge stream. The treated air, after passing through a carbon filter as previously described, is found to contain 23.9 milligrams per cubic foot of air, Chemical Oxygen Demand (COD), and 0–1 odor units, while untreated and unfiltered air from the same source contains 97.6 milligrams of organic matter per cubic foot of air and 2500 odor units. The treated air, as an alternative to carbon bed filtration, is passed through a cyclone scrubber with a water spray injected and thoroughly mixed before entering the cyclone, and the air existing the cyclone contains 5.58 milligrams of organic matter per cubic foot of air, compared with untreated and unscrubbed air containing 41.3 milligrams of organic matter per cubic foot of air and 0–1 odor units. This represents a 75.6 percent reduction of organic matter by carbon filtration and an 86.4 percent reduction by cyclone scrubbing. There is no residual chlorine after treatment.

EXAMPLE 12

In another rendering plant, a sample of odoriferous air from feather and meat storage is flowed through the reactor at the rate of 100 cubic feet per minute while chlorine gas flows into the steam at the rate of 4.0 cubic centimeters per minute. The steam flow is 110.0 cubic centimeters per minute. The chlorine-steam mixture and the odoriferous air are passed through a fan blower and through a water spray. The water spray flows at the rate of 0.03 gallon per minute. The combined components flowed into a cyclone after twisting around a helical vane placed in the entrance to the cyclone. Air free of moisture and droplets escapes at the top of the cyclone, while liquid escapes at the bottom. Chemical Oxygen Demand (COD) analysis reveals that the untreated air contains 47.0 milligrams of organic matter per cubic foot and 2200 odor units, and that the treated air contains 3.33 milligrams of organic matter per cubic foot and 0–1 odor unit. The treated air is completely nonodoriferous and the standard test for residual chlorine, as found in Standard Methods, American Health Association, is negative. There is no misting from steam introduced into the air flow, and it is assumed that the steam is substantially completely removed by the cyclone scrubbing.

EXAMPLE 13

In the experiment of Example 12, an additional water spray is placed in front of the fan blower where the spray is drawn into the fan and violently mixed with the air. This extra step alone, and without the water spray after the fan, produces consistent increases in reduction of COD of about three percent. The fan scrubbing is, therefore more efficient to a limit, but additional water spray after the fan further reduces the COD since absorption is a function of total liquid surface and "young surface" of liquid. As usual, the treated air is non-odoriferous, but further reduction of COD and organic matter is accomplished

EXAMPLE 14

The rendering air from a feather dryer is treated by injection of a chlorine-steam mixture, and the resulting treated air is subjected to scrubbing water with selected additives to enhance the removal of organic materials from the treated air. As a control, the treated air is sprayed with scrubbing water containing no additive; no odoriferous matter in the water-scrubbed air is detectable by scent. The scrubbing experiment is repeated with a 5% solution of sodium hydroxide to provide a basic scrub solution possessing solubility properties for certain organic materials not possessed by water alone, and also capable of raising pH. The sodium hydroxide solution is then replaced by a 5% solution of alkali detergent, also referred to as a surfactant. The rate of scrubbing water flow in each case is between 0.1 to 1.0 gallon per minute. In terms of total organic matter, the detergent solution was superior both to pure water and sodium hydroxide (pure alkali). The removal of organic matter together with odoriferous matter is enhanced by addition of alkali and detergent. The scrubbing solution of detergent is recycled to exhaustion, and the number of cycles of reuse is in excess of 50 cycles. The higher flow rates of scrubbing material are more effective, although excellent results are obtained with a flow rate of 0.03 gallon per minute and greater flow rates did not produce more than 0.5% difference in COD. The standard tests for residual chlorine are negative at the low and high rates of flow for the scrubbing solutions. The treated air varies between 1–5 odor units.

EXAMPLE 15

The odorous air from Example 5 is treated by injecting a mixture of chlorine and steam in place of water. The chlorine is flowed into the water and is mixed as in Example 5, and the water flows from 5.0 to 3000.0 cubic centimeters per minute. The untreated air contains 15,000 odor units. After spraying water and chlorine solution into the air stream, odor tests are taken. Best results are obtained at 35.0 cubic centimeters of chlorine, and 3000.0 cubic centimeters per minute of water at 60° F. The lowest odor level obtained is 1250 odor units. There is consistent residual chlorine in the air discharge. The untreated air flows at 100 cubic feet per minute. The same experiment and treatment above is repeated while the temperature of the water is varied. Odor level decreases when the temperature of the water reaches 160° F. and odor level continues to decrease after 160° F. until 212° F. Odor level reduction is enhanced by decreasing water flow. The greatest reduction occurs at 0.1–1.0 cubic centimeter of water and 1–5 odor units at 8.0 cubic centimeters per minute of chlorine flow. Further reduction of water vapor or steam is made to 100.0 cubic centimeters per minute. The untreated air flows at 100 cubic feet per minute.

EXAMPLE 16

A flow of air from a shell and tube condenser primarily producing noncondensable gases is treated by injecting a chlorine and steam mixture into the air stream. The untreated noncondensable gases rate in excess of 100,000 odor units. The untreated air flows at 200 cubic feet per minute. Best results are obtained at a flow of 35.0 cubic centimeters per minute of chlorine mixed with steam flowing at about 110–300 cubic centimeters per minute. The treatment reduces the odor level by 85 percent. Re-cycling of the air further reduces the odor level, and after five recycles the odor level is reduced to 1–25 odor units. A flow of air from a barometric condenser is treated and the odor level is rated at 45,000 odor units. Chlorine at the rate of 8.0 cubic centimeters per minute is mixed with steam at the rate of 200 cubic centimeters per minute, and the mixture is injected into the air stream. The odor level is reduced to 0–3 odor units. These condensers are located at rendering plants which process meat and feathers. The condensers remove steam and vapor from driers and cookers.

EXAMPLE 17

A sample of odorous air from a sewage treatment plant is treated by injecting a mixture of chlorine and steam into the air stream. The air flows at 200.0 cubic feet per minute. The chlorine flows at 4.9 cubic centimeters per minute into steam at 290 cubic centimeters per minute and at a temperature of 220° F. The initial odor level is 3500 odor units and the treated air rates 1 odor unit. The air is not scrubbed or otherwise treated further. The sample of odorous air flow varied in odor units as much as 25 percent. To compensate for the variation in odor, the chlorine in the steam flow is controlled by installing a chlorine detector and suitable flow control apparatus to control and throttle the chlorine flow. By employing a checking device there is never residual chlorine, but always sufficient chlorine to remove the odor and oxidize the odoriferous matter.

It is found that the chlorine-steam mixture used in the foregoing examples is highly corrosive to materials such as stainless steel, plastics, and some other alloys, and injection nozzles made of such materials proved to be very vulnerable and short-lived. A nozzle constructed of titanium, however, withstood 100 hours of operation with only surface discoloration and no visible indication of corrosion. The titanium nozzle was subjected to a chlorine-steam mixture with chlorine concentrations as high as 15.0% of steam volume, a mixture which is very deleterious for most metallic surfaces. Nozzle pressures up to 60.0 pounds per square inch were utilized without evidence of corrosion in the titanium nozzle.

While this invention has been described in detail, with particular reference to preferred embodiments thereof, it will be understood that variations and modifications can be effected within the spirit and the scope of the invention as described hereinbefore and as defined in the appended claims.

What is claimed is:

1. Process for de-odorizing, coalescing, coagulating, and agglomerating particulate and molecular material within a gaseous media, comprising the steps of introducing into the media a mixture of a gas and a carrier medium so that said gas in molecular state is present in the media, said mixture being at a temperature of about 60° F. to about 900° F., reacting the molecular gas with the surface molecules of the particulate material present in the media to produce areas of altered surface characteristics which induce coalescing, coagulating, and agglomerating of the particulate material, and reacting the molecular gas with the molecular material to produce solid phase material.

2. The method of claim 1 wherein said gas is selected from the group consisting of the halogen compound group, ammonia, hydrogen sulfide, carbon dioxide, sulfur dioxide, nitrogen oxides, ozone, and combinations thereof.

3. The method of claim 2, wherein said gas is boron tetrafluoride.

4. The method of claim 1, comprising removing the agglomerated solid particulate material and the solid phase material from the effluent media.

5. The method of claim 1, wherein said carrier medium is water at a temperature of about 60° F. to about 900° F.

6. The method of claim 1, wherein said carrier medium is steam at a temperature of about 212° F. to about 900° F.

7. The method of claim 2, wherein said gas is chlorine.

8. The method of claim 7, wherein said carrier medium is steam at a temperature of about 212° F. to about 900° F.

9. The method of claim 2, wherein said gas is a mixture of chlorine and boron tetrafluoride.

10. The method of claim 7, wherein the carrier medium is water at a temperature of about 60° F. to about 212° F.

References Cited

UNITED STATES PATENTS

| 3,353,335 | 11/1967 | Caballero | 55—223 |
| 3,385,030 | 5/1968 | Letvin | 55—90 |
| 3,403,498 | 10/1968 | Pasha | 55—90 |
| 3,613,333 | 10/1971 | Gardenier | 55—89 |
| 3,574,562 | 4/1971 | Kawahata | 55—73 |
| 3,528,220 | 9/1970 | Warner et al. | 55—89 |

CHARLES N. HART, Primary Examiner

U.S. Cl. X.R.

423—223, 235, 237, 240